US011965628B1

(12) United States Patent
Zong et al.

(10) Patent No.: US 11,965,628 B1
(45) Date of Patent: Apr. 23, 2024

(54) CABLE CONTAINING LED LIGHT STRIP DRIVEN BY INDUCED CURRENT

(71) Applicant: Shanghai Lanhao Jiangsu Electric Co., Ltd., Nantong (CN)

(72) Inventors: Lei Zong, Nantong (CN); Chunyan Liu, Nantong (CN)

(73) Assignee: SHANGHAI LANHAO JIANGSU ELECTRIC CO., LTD., Nantong (CN)

( * ) Notice: Subject to any disclaimer, the term of this patent is extended or adjusted under 35 U.S.C. 154(b) by 0 days.

(21) Appl. No.: 18/487,161

(22) Filed: Oct. 16, 2023

(30) Foreign Application Priority Data

Jul. 10, 2023 (CN) ......................... 202310843074.0

(51) Int. Cl.

| | |
|---|---|
| ***F21S 4/22*** | (2016.01) |
| ***H01B 9/00*** | (2006.01) |
| *F21W 131/10* | (2006.01) |
| *F21Y 115/10* | (2016.01) |

(52) U.S. Cl.
CPC ................ *F21S 4/22* (2016.01); *H01B 9/005* (2013.01); *F21W 2131/1005* (2013.01); *F21Y 2115/10* (2016.08)

(58) Field of Classification Search
CPC .................................. F21S 4/22; H01B 9/005
See application file for complete search history.

(56) References Cited

U.S. PATENT DOCUMENTS 11,437,168 B1 * 9/2022 Liu ...................... H01R 13/516
2020/0096164 A1 * 3/2020 Lin ......................... G06F 1/189

FOREIGN PATENT DOCUMENTS

CN 212056824 U * 12/2020
EP 4113543 A1 * 1/2023 ............ A01M 29/10

* cited by examiner

*Primary Examiner* — Karabi Guharay
(74) *Attorney, Agent, or Firm* — Fredrikson & Byron, P.A.

(57) ABSTRACT

A cable containing an LED (Light Emitting Diode) light strip driven by an induced current is provided. The cable includes an LED light strip, a cable core and an outer protection layer covering the cable core and the LED light strip. The cable core includes at least one power wire core. The LED light strip includes a coil block and an LED chip which are connected in series to form a closed loop. The coil block generates an induced potential under the action of an alternating magnetic field generated after the power wire core is powered on. The LED chip is lightened by the induced potential. The outer protection layer is made of a light-transmitting material.

11 Claims, 2 Drawing Sheets

CABLE CONTAINING LED LIGHT STRIP DRIVEN BY INDUCED CURRENT

CROSS-REFERENCE TO RELATED APPLICATION

This patent application claims the benefit and priority of Chinese Patent Application No. 2023108430740 filed with the China National Intellectual Property Administration on Jul. 10, 2023, the disclosure of which is incorporated by reference herein in its entirety as part of the present application

TECHNICAL FIELD

The present disclosure relates to the technical field of cables, in particular to a cable containing an LED (Light Emitting Diode) light strip driven by an induced current.

BACKGROUND

In some special environments, such as open-pit coal mines, cables are often dragged and moved while being paved on the ground without good protection, and follow the movement of electric shovels and other equipment. There are many engineering vehicles for transporting coal around the electric shovels. At night or in dark environment, because site operators cannot see the cables, the cables are often crushed by the engineering vehicles, resulting in cable damage, shortened cable service life and greatly increased use cost. In a traditional cable containing an LED light strip, an electric cabinet needs to be externally connected to a low-voltage direct-current power supply so as to lighten the LED light strip. However, in general open-pit coal mines and other occasions, the voltage of the electric cabinet is often unsuitable for the LED light strip, resulting in the abandonment of the visual function in the traditional cable containing an LED light strip to cause the waste.

SUMMARY

The present disclosure aims to provide a cable containing an LED light strip driven by an induced current to solve the problems in the prior art. A coil block generates an induced potential through an alternating magnetic field generated after a power wire core is powered on, and the LED light strip is driven by the induced potential, so that the LED light strip can be lightened without an additional power supply. The construction is simple and convenient, so that the cable can have a visual function at night, thereby ensuring that the cable is not crushed in the operational process, and the safe use of the cable is guaranteed.

In order to achieve the purpose, the present disclosure provides the following scheme.

The present disclosure provides a cable containing an LED light strip driven by an induced current. The cable includes an LED light strip, a cable core and an outer protection layer covering the cable core and the LED light strip. The cable core includes at least one power wire core. The LED light strip includes a coil block and an LED chip which are connected in series to form a closed loop. The coil block generates an induced potential under the action of an alternating magnetic field generated after the power wire core is powered on. The LED chip is lightened by the induced potential. The outer protection layer is made of a light-transmitting material.

In some embodiments, the power wire core includes a power wire core conductor and an insulation layer covering the power wire core conductor.

In some embodiments, a power wire core conductor shielding layer is arranged between the power wire core conductor and the insulation layer.

In some embodiments, the insulation layer is covered with a nonmetal shielding layer and a metal shielding layer in sequence, or the insulation layer is covered with a nonmetal shielding layer or a metal shielding layer.

In some embodiments, the LED light strip further includes a light-strip protecting layer covering the coil block and the LED light chip, and the light-strip protecting layer is made of a light-transmitting material. The coil block includes a plurality of coils connected in series.

In some embodiments, the LED light strip includes a plurality of independent closed loops, and the closed loops are arranged in sequence along the length direction LED light strip.

In some embodiments, the LED light strip is a single-sided LED light strip or a double-sided LED light strip. At least one LED light strip is provided. The LED light strip is a light strip with a single light-emitting color or light strip with a plurality of light-emitting colors. The LED light strip has a shape of a circle, a rectangle, an oval, a triangle or a trapezoid.

In some embodiments, the cable core further includes a ground wire core and a grounding detection wire core. The grounding detection wire core includes a detection wire core conductor and a detection wire core insulation layer covering the detection wire core conductor. Three power wire cores are arranged. The three power wire cores, the LED light strip, the ground wire core and the grounding detection wire core are stranded and connected, and the stranded lay ratio is 2 to 30. The three power wire cores are mutually attached in pair and form three gaps on the outer side, and the LED light strip, the ground wire core and the grounding detection wire core are respectively arranged in the three gaps and attached with the three power wire cores.

In some embodiments, the cable core further includes a control wire core and an optical fiber unit.

In some embodiments, the outer protection layer is made of a transparent or semitransparent polymer material, and the light-strip protecting layer is made of a transparent or semitransparent polymer material.

Compared with the prior art, the present disclosure has the following technical effects.

The present disclosure provides a cable containing an LED light strip driven by an induced current. After the cable is powered on, an alternating current passes through the power wire core, and a vortex alternating magnetic field is formed around the power wire core. The coil block near the power wire core generates the induced potential under the action of the alternating magnetic field. The induced current is generated in the closed loop through the induced potential. The LED chip is lightened by the induced current, so that the LED light strip can be lightened without an additional power supply. The construction is simple and convenient, so that the cable can have a visual function at night, thereby ensuring that the cable is not crushed in the operational process, and the safe use of the cable is guaranteed. At the same time, the LED cable can also be convenient to find at night, thus bringing great convenience to cable laying and maintenance.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Reference signs: 1, LED light strip; 10, closed loop; 11, coil block; 111, coil; 12, LED chip; 13, light-strip protecting layer; 2, outer protection layer; 3, power wire core; 31, power wire core conductor; 32, insulation layer; 33, power wire core conductor shielding layer; 34, nonmetal shielding layer; 35, metal shielding layer; 4, ground wire core; 5, grounding detection wire core; 51, detection wire core conductor; and 52, detection wire core insulation layer.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a cable containing an LED light strip driven by an induced current to solve the problems in the prior art. A coil block generates an induced potential through an alternating magnetic field generated after a power wire core is powered on, and the LED light strip is driven by the induced potential, so that the LED light strip can be lightened without an additional power supply. The construction is simple and convenient, so that the cable can realize a visual function at night, the cable is not crushed in the operational process, and the safe use of the cable is guaranteed.

To make the foregoing objective, features and advantages of the present disclosure clearer and more comprehensible, the present disclosure is further described in detail below with reference to the attached figures and specific embodiments.

Figure 1:
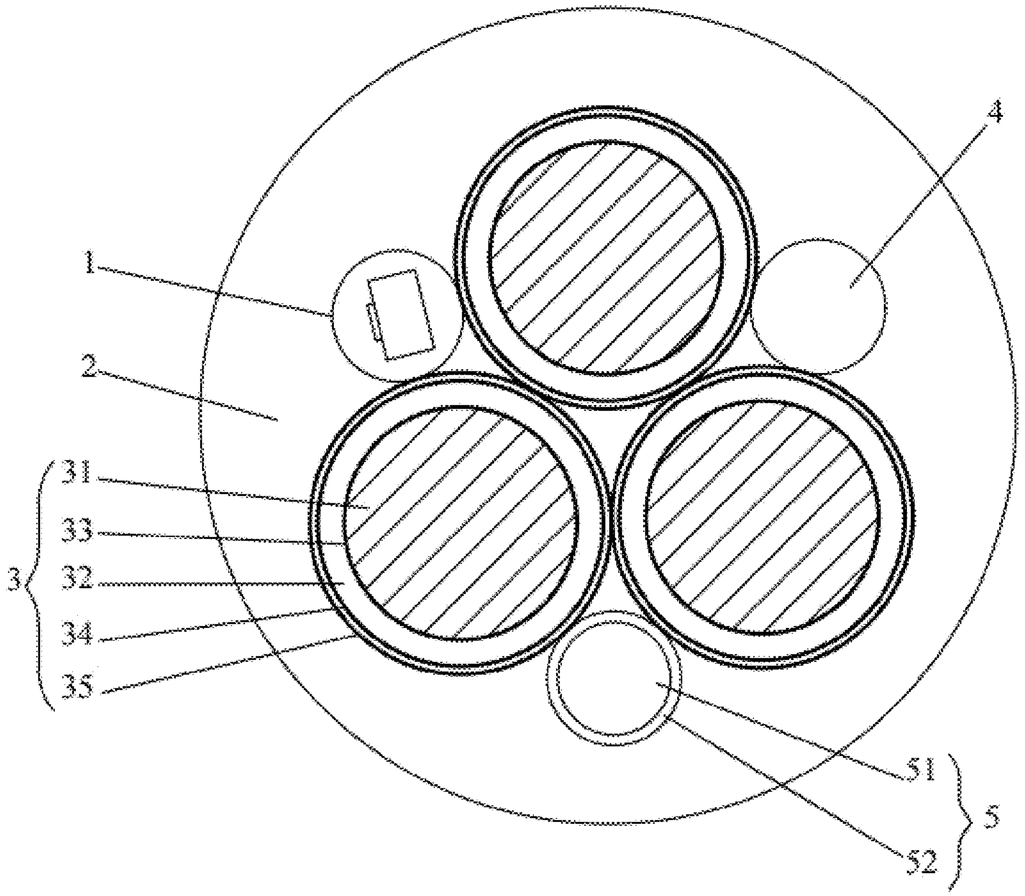
FIG. 1 is a structural schematic diagram of a cable containing an LED light strip driven by an induced current provided by the present disclosure.
Figure 2:
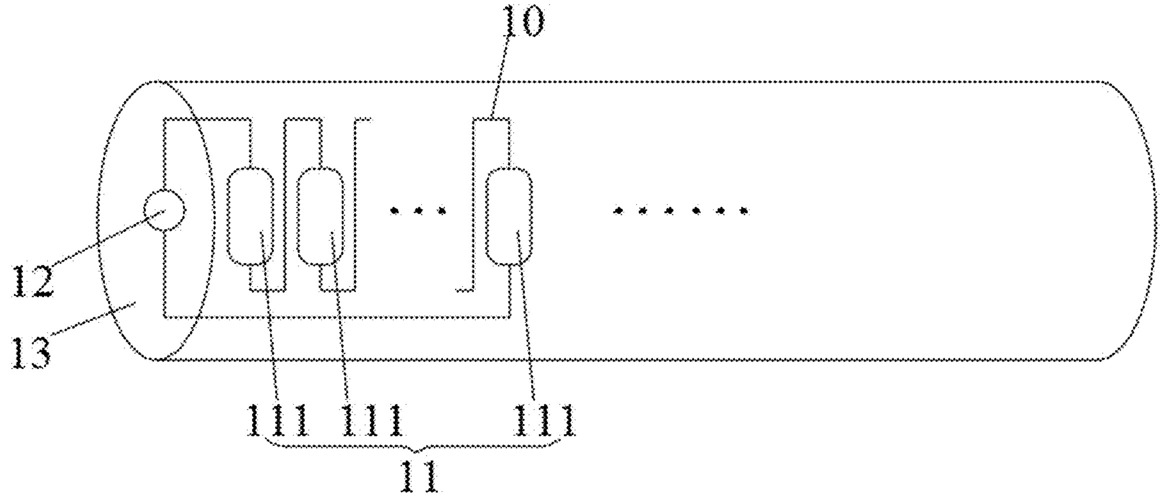
FIG. 2 is a structural schematic diagram of an LED light strip in the present disclosure.
Figure 3:
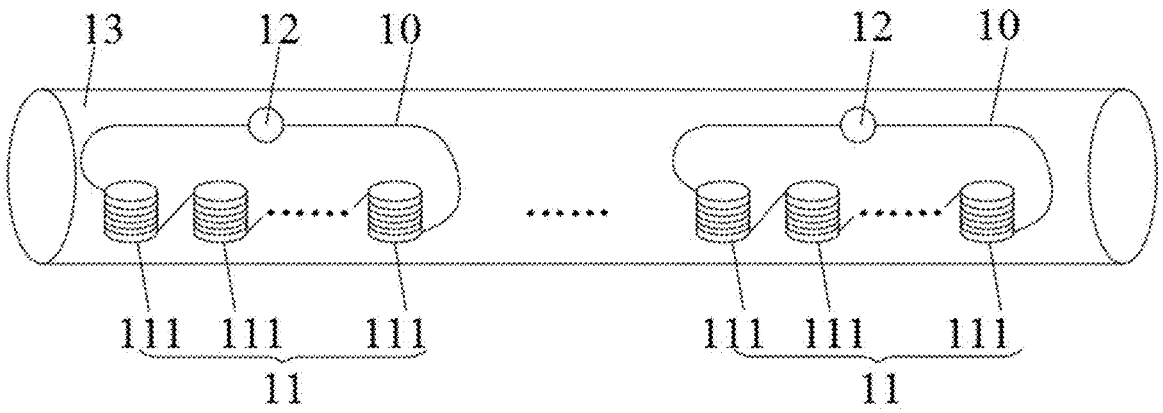
FIG. 3 is a wiring schematic diagram of coils and LED chips in the present disclosure.
Figure 4:
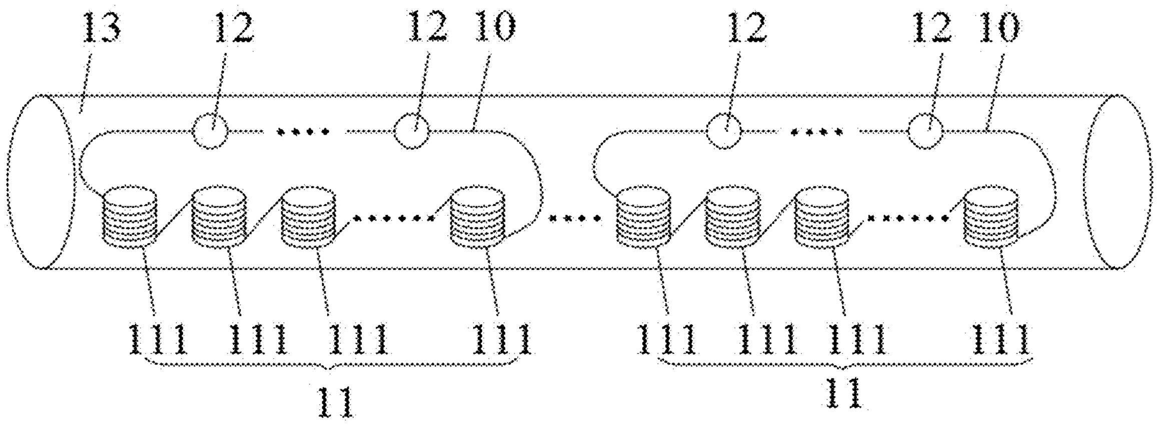
FIG. 4 is another wiring schematic diagram of coils and LED chips in the present disclosure.

As shown in FIGS. 1 to 4, the embodiment provides a cable containing an LED light strip driven by an induced current. The cable includes an LED light strip 1, a cable core and an outer protection layer 2 covering the cable core and the LED light strip 1. The cable core includes at least one power wire core 3. The LED light strip 1 includes a coil block 11 and an LED chip 12 which are connected in series to form a closed loop 10. The coil block 11 generates an induced potential under the action of an alternating magnetic field generated after the power wire core 3 is powered on. The LED chip 12 is lightened by the induced potential. The outer protection layer 2 is made of a light-transmitting material.

After the cable is powered on, an alternating current passes through the power wire core 3, and a vortex alternating magnetic field is formed around the power wire core 3. The coil block 11 near the power wire core 3 generates the induced potential under the action of the alternating magnetic field. The induced current is generated in the closed loop 10 through the induced potential. The LED chip 12 is lightened by the induced current, so that the LED light strip 1 can be lightened without an additional power supply. The construction is simple and convenient, so that the cable can have a visual function at night, thereby ensuring that the cable is not crushed in the operational process, and the safe use of the cable is guaranteed. At the same time, LED cable can also be convenient to find at night, thus bringing great convenience to cable laying and maintenance.

In some embodiments, the power wire core 3 includes a power wire core conductor 31 and an insulation layer 32 covering the power wire core conductor 31.

In some embodiments, a power wire core conductor shielding layer 33 is arranged between the power wire core conductor 31 and the insulation layer 32.

In some embodiments, the insulation layer 32 is covered with a nonmetal shielding layer 34.

In some embodiments, the insulation layer 32 is covered with a metal shielding layer 35.

In some embodiments, the insulation layer 32 is covered with a nonmetal shielding layer 34 and a metal shielding layer 35 in sequence.

The power wire core 3 can only include a power wire core conductor 31 and an insulation layer 32, or besides a power wire core conductor 31 and an insulation layer 32, additionally include one, two or three of a power wire core conductor shielding layer 33 (nonmetal material), a nonmetal shielding layer 34 and a metal shielding layer 35.

In some embodiments, the LED light strip 1 further includes a light-strip protecting layer 13 covering the coil block 11 and the LED light chip 12, and the light-strip protecting layer 13 is made of a light-transmitting material. The coil block 11 includes a plurality of coils 111 connected in series. When the induced potential of one coil 111 is insufficient to lighten the LED light chip 12, a plurality of coils 111 may be connected in series to enhance the induced potential so as to lighten the LED chip 12 (shown in FIG. 3), or a plurality of coils 111 may be connected in series and a plurality of LED chips 12 may be connected in series to lighten a plurality of LED chips 12 simultaneously (shown in FIG. 4).

In some embodiments, the LED light strip 1 includes a plurality of independent closed loops 10. When one closed loop 10 is provided, the closed loop 10 is arranged along the length direction of the LED light strip 1. When two or more than two closed loops 10 are provided, the closed loops 10 are arranged in sequence along the length direction of the LED light strip 1. Since a plurality of independent working units (closed loops 10) can be used, the problem that the whole cable cannot emit light due to the fact that the cable is cut off in the using process is avoided.

When in use, a plurality of independent closed loops 10 can be canned in a transparent tube to form an LED light strip 1, and the LED light strip 1 is placed beside any power wire core 3 or in a gap between any two power wire cores 3 as a light emitting unit so that the cable emits light.

In some embodiments, the LED light strip 1 is a single-sided LED light strip or a double-sided LED light strip, and it is only necessary to ensure that a light-emitting surface of the single-sided LED chip 12 faces outward. At least one LED light strip 1 is provided, and can be arranged at any position around the cable core. The LED light strip 1 is a light strip with a single light-emitting color or a light strip with a plurality of light-emitting colors for increasing the visual effect of the cable and high-lighting the cable. The shape of the LED light strip 1 is a circle, a rectangle, an oval, a triangle and a trapezoid, but is not limited to the above shapes.

In some embodiments, the cable core further includes a ground wire core 4 and a grounding detection wire core 5. The grounding detection wire core 5 includes a detection wire core conductor 51 and a detection wire core insulation layer 52 covering the detection wire core conductor 51. The power wire core 4 is used for grounding. The grounding detection wire core 5 is used for detecting the on-off condition of grounding. Three power wire cores 3 are arranged, the three power wire cores 3, the LED light strip 1, the ground wire core 4 and the grounding detection wire core 5 are stranded and connected, and the stranded lay ratio is 2 to 30. The three power wire cores 3 are mutually attached in pair and form three gaps on the outer side, and the LED light strip 1, the ground wire core 4 and the grounding detection wire core 5 are respectively arranged in the three gaps and attached with the three power wire cores 3, ensuring that the LED light strip 1, the three power wire cores 3, the ground wire core 4 and the grounding detection wire core 5 is stably operated in the respective working processes. The LED light strip 1 is closely attached to the outer layer of the power wire core 3, and the efficiency of generating the induced current can be improved, and so that the performance of the LED cable is guaranteed.

In some embodiments, the cable core further includes a control wire core and an optical fiber unit. At the moment, the ground wire core 4 and the grounding detection wire core 5 may not be arranged, or the ground wire core 4 and the grounding detection wire core 5 is replaced by a control wire core and an optical fiber unit.

In some embodiment, the outer protection layer 2 is made of a transparent or semitransparent polymer material, and the light-strip protecting layer 13 is made of a transparent or semitransparent polymer material. The visualization of the LED light strip 1 is ensured, and the visualization effect of the cable is increased. The cable is visible at night and in dark environment, and is prevented from being crushed by surrounding engineering vehicles and equipment to cause cable damage, so that the safety performance of the cable is improved.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In summary, the contents of this specification should not be understood as the limitation of the present disclosure.

What is claimed is:

1. A cable containing an LED (Light Emitting Diode) light strip driven by an induced current, comprising an LED light strip, a cable core and an outer protection layer covering the cable core and the LED light strip, wherein the cable core comprises at least one power wire core, the LED light strip comprises a coil block and an LED chip which are connected in series to form a closed loop, the coil block generates an induced potential under an action of an alternating magnetic field generated after the power wire core is powered on, the LED chip is lightened by the induced potential, and the outer protection layer is made of a light-transmitting material.

2. The cable containing an LED light strip driven by an induced current according to claim 1, wherein the power wire core comprises a power wire core conductor and an insulation layer covering the power wire core conductor.

3. The cable containing an LED light strip driven by an induced current according to claim 2, wherein a power wire core conductor shielding layer is arranged between the power wire core conductor and the insulation layer.

4. The cable containing an LED light strip driven by an induced current according to claim 3, wherein the insulation layer is covered with a nonmetal shielding layer and a metal shielding layer in sequence, or the insulation layer is covered with a nonmetal shielding layer or a metal shielding layer.

5. The cable containing an LED light strip driven by an induced current according to claim 2, wherein the insulation layer is covered with a nonmetal shielding layer and a metal shielding layer in sequence, or the insulation layer is covered with a nonmetal shielding layer or a metal shielding layer.

6. The cable containing an LED light strip driven by an induced current according to claim 1, wherein the LED light strip further comprises a light-strip protecting layer covering the coil block and the LED light chip, and the light-strip protecting layer is made of a light-transmitting material; and the coil block comprises a plurality of coils connected in series.

7. The cable containing an LED light strip driven by an induced current according to claim 6, wherein the outer protection layer is made of a transparent or semitransparent polymer material, and the light-strip protecting layer is made of a transparent or semitransparent polymer material.

8. The cable containing an LED light strip driven by an induced current according to claim 1, wherein the LED light strip comprises a plurality of independent closed loops, and the closed loops are arranged in sequence along a length direction of the LED light strip.

9. The cable containing an LED light strip driven by an induced current according to claim 1, wherein the LED light strip is a single-sided LED light strip or a double-sided LED light strip; the LED light strip comprises at least one LED light strip; the LED light strip is a light strip with a single light-emitting color or a light strip with a plurality of light-emitting colors; and the LED light strip has a shape of a circle, a rectangle, an oval, a triangle or a trapezoid.

10. The cable containing an LED light strip driven by an induced current according to claim 1, wherein the cable core further comprises a ground wire core and a grounding detection wire core, the grounding detection wire core comprises a detection wire core conductor and a detection wire core insulation layer covering the detection wire core conductor; the power wire core comprises three power wire cores, the three power wire cores, the LED light strip, the ground wire core and the grounding detection wire core are stranded and connected, and the stranded lay ratio is 2 to 30; and the three power wire cores are mutually attached in pair and form three gaps on an outer side, and the LED light strip, the ground wire core and the grounding detection wire core are respectively arranged in the three gaps and attached with the three power wire cores.

11. The cable containing an LED light strip driven by an induced current according to claim 1, wherein the cable core further comprises a control wire core and an optical fiber unit.

* * * * *